April 29, 1952   H. C. WHEELER   2,595,033
PINKING SHEARS
Filed March 5, 1951
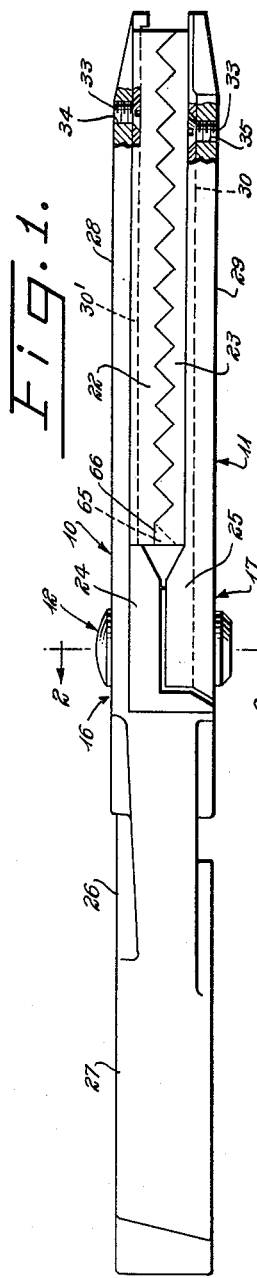
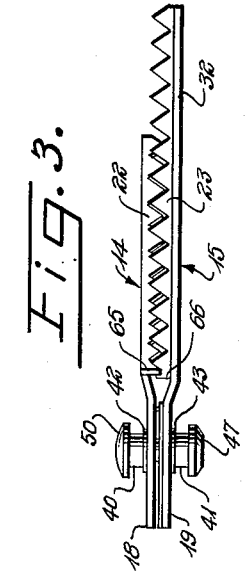
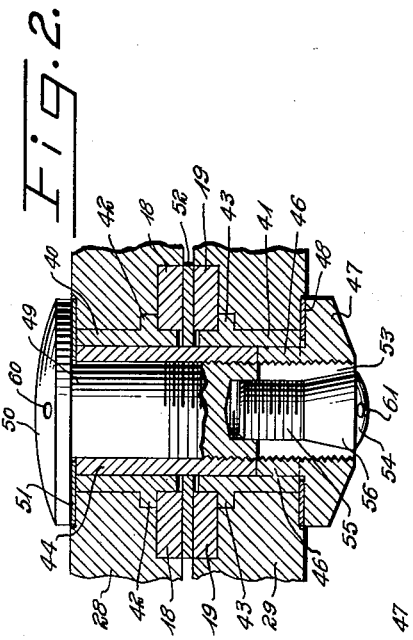
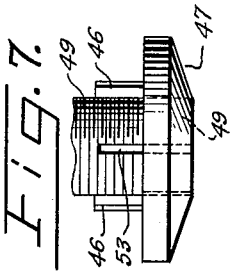
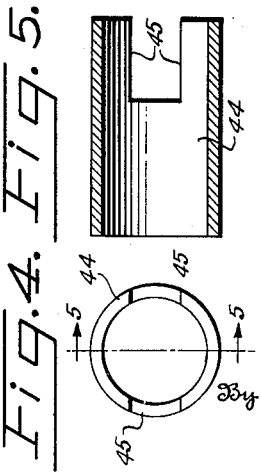
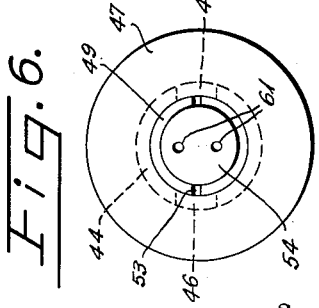
Inventor
HENRY C. WHEELER
By Henry Van Arsdale
Attorney Patented Apr. 29, 1952

2,595,033

UNITED STATES PATENT OFFICE 2,595,033

PINKING SHEARS

Henry C. Wheeler, Bridgeport, Conn., assignor to Acme Shear Company, Bridgeport, Conn.

Original application November 4, 1948, Serial No. 58,169, now Patent No. 2,582,184 dated January 8, 1952. Divided and this application March 5, 1951, Serial No. 213,839

3 Claims. (Cl. 30—270)

1

This invention relates to shears and more particularly to pinking shears, and this application is a division of my prior application Ser. No. 58,169, filed November 4, 1948, for Pinking Shears.

In pinking shears, as in straight edged shears, it is important that the cutting edges of the blades make accurate cutting contact throughout the entire length of the cutting span. Whereever the blades do not have proper cutting contact the material being cut is likely to be torn or to become wedged between the blades without being cut.

Because the cutting edges of pinking shears are serrated it is more difficult to fashion and to adjust the blades of pinking shears so that there will be proper and effective cutting engagement between the edges throughout the entire extent of the cutting edges than it is to fashion and adjust the blades of straight cutting shears. Also, comparatively slight displacement of the blades of pinking shears from their proper precision adjustment is likely to impair the cutting coaction of the blades. This could easily happen if an amateur or unauthorized person should attempt to tamper with the adjustment.

Accordingly a principal object of this invention is to provide a pivot assembly for pivotally connecting the blades of shears, and particularly pinking shears, whereby the blades may be placed in proper and precision adjustment at the factory and so constructed and arranged as to prevent, or, at least to make it extremely difficult for the housewife or other unauthorized person to manipulate and adjust the pivot assembly in an attempt to change the adjustment of the blades. The intent is that when readjustment seems necessary the blades shall be returned to the factory or to some other authorized place for readjustment.

A further object of this invention is to provide pinking shears which are simple, durable, light and inexpensive in construction, which operate effectively, smoothly and easily on a wide variety of materials and on a wide range of thickness of materials, and which are attractive in appearance and are easy to handle and to use.

Other objects of this invention will be in part obvious and in part pointed out hereinafter.

In accordance with this invention, the pivot assembly is so constructed and arranged that there is nothing a person may turn, screw or twist, without the greatest of inconvenience and difficulty to alter the adjustment of the blades, unless special tools are used.

The invention accordingly consists in the features of construction, arrangement of parts and combinations of elements which will be more fully described hereinafter and the scope of the application of which will be set forth in the claims that follow.

In order that a clearer understanding of this invention may be had, attention is hereby directed to the accompanying drawings, forming a part of this application and illustrating certain possible embodiments of this invention, and in which:

Figure 1 is an edge plan view of a pair of shears embodying this invention;

Figure 2 is an enlarged sectional view at the pivot assembly, and is taken on the line 2—2 of Fig. 1;

Figure 3 is a plan view of the cutting blades in wide open relation, and the pivot assembly, the holding blades being omitted;

Figure 4 is a plan view of the inner sleeve of the pivot assembly;

Figure 5 is a sectional view of the same and is taken on the line 5—5 of Fig. 4;

Figure 6 is an elevation of the pivot assembly at the nut side thereof; and

Figure 7 is a side view partly broken away of the nut of the pivot assembly with the slit end of the tension screw engaged therein.

Similar reference characters refer to similar parts throughout the several views of the drawings.

Referring to the drawings, the shears comprise two complemental blades, indicated generally at 10 and 11, pivotally connected by a pivot assembly generally indicated at 12. Each blade is composite, including a cutting blade, 14, 15, and a supporting blade, 16, 17 for the cutting blade. Each supporting blade centrally, and each cutting blade toward its rear end is provided with an aperture to receive the pivot assembly.

The cutting blades may be comparatively thin strips of suitable metal having flat portions 18, 19 in which the pivot apertures are formed and outwardly thereof having flat portions each having a row of pinking teeth 22, 23 along one edge and projecting toward the other cutting blade when the cutting blades are in position on the supporting blades.

Each supporting blade has a central portion 24, 25 having an aperture for the pivot assembly, a handle portion 26, 27 rearwardly thereof and a portion 28, 29 extending forwardly thereof. Each portion 28, 29 has a flat surface with an abutment flange, such as 30, 30' along one edge, the cutting blades 14, 15 being adapted to be placed against the inner surfaces of the supporting blades with the flat surfaces of the cutting blades lying flat against the flat surfaces of the supporting blades and with the under edges of the cutting blades seating against the shoulders 30, 30' of the supporting blades. When the blades are properly pivotally connected by means of the pivot assembly the rows of pinking teeth of the two cutting blades are so positioned that the teeth will be bisected by the plane of cutting movement of the shears.

The cutting blades are further firmly secured to the supporting blades by suitable screws 33, which extend through suitable apertures 34, 35 formed in the cutting blades toward their ends and engage in threaded holes in the supporting blades.

The pivot assembly includes two bushings 40, 41 one for each blade and each having a pressed fit in the aperture provided therefor in the cutting blade, each bushing having an annular stop flange, 42, 43 seating against the outer surface of the cutting blade. The outer portion of the bushings are adapted to be received in the apertures of the supporting blades, these blades being suitably recessed to accommodate the flanges 42, 43 of the bushings.

These bushings 40, 41 encircle an inner sleeve or bushing 44 which has a pressed fit in bushing 40 so as to be non-rotatively fixed thereto; sleeve 44 and bushing 41 being relatively rotatable. The end of sleeve 44 at bushing 41 has a pair of notches or keyways 45 adapted to receive two internally threaded axial projections or keys 46 of a nut 47, the nut overlapping the supporting blade 29, and, if desired a washer 48 may be disposed between the nut and the blade. A bolt or screw 49 having a head 50 is adapted to be entered from the opposite side of the shears and into the sleeve 44 and engaged with the nut 47 and its threaded projections or keys 46. The head 50 of screw 49 overlaps supporting blade 29 and a washer 51 may be provided between the screw head and the blade. Preferably a suitably apertured wear plate 52 is disposed between the cutting blades and about the pivot connection.

The entrant end of screw 49 is slit, as at 53, and suitably bored and tapped to receive an expander screw 54 which has a threaded stem such as 55, and a conical expander portion, such as 56, between the head end of the screw and the threaded portion. Thus by screwing the expander screw 54 into the split screw 49 the slit end portion of screw 49 is expanded by the expander portion 56 of screw 54 against the nut 47 and its projections or keys 46 and the screw 49 and nut 47 are positively and firmly locked together.

To prevent unauthorized displacement or turning of either the screw 49 or the expander screw 54 they are provided with special tool receiving holes or notches or sockets or the like which require special tools to be engaged therein to turn the screws. For instance, special holes, such as 60, may be formed in the head 50 of screw 49 and holes, such as 61, in the top of the expander screw 54, so that special tools will be required to turn the screws. A small hexagonal socket requiring a special tool would also meet the requirement, or other forms of special tool sockets may be used. After proper adjustment has been made at the factory the socket holes may be filled with suitable material to conceal them or to make it difficult to engage a tool in them. Additionally it is obvious that the adjustment of the pivot assembly cannot be changed by any pivotal movement of the blades.

The shears are adjusted and tensioned by screwing the screw 49 into the nut 47. The tighter screw 49 is screwed into nut 47 the tighter the blades of the shears are tensioned together. As shown, the rear portion of the cutting blades from the inner end of the rows of pinking teeth rearwardly are seated in recesses provided therefor in the supporting blades, and abutted on their side and rear edges by the walls of the recesses.

The manner of assembling the shears is clear from the above. To effect a readjustment the expander screw 54 is first loosened by means of a special tool. Then the adjustment is made by turning screw 49 one way or the other by means of a special tool, and then the expander screw is again tightened.

As many changes may be made in the above construction without departing from the scope of this invention it is understood that all matter contained in the above description or shown in the accompanying drawings be interpreted as illustrative and not in a limiting sense.

What I claim is:

1. In shears or the like having a pair of blades, a pivot structure connecting the blades for scissor-like manipulation, said pivot structure including a tubular blade-engaging bushing fixed in an aperture in each blade and against rotation relatively to the blade, an interior tubular bushing within and embraced by both said bushings, one of the blade-engaging bushings being fixed to said interior bushing against relative rotation therewith and the other blade-engaging bushing being rotatable relatively to said interior bushing, a headed screw extending through said interior bushing from one side of the shears or the like, a nut on the opposite side of the shears or the like engaged by said screw, the entrant end of said screw being split and bored and tapped to receive an expander screw, and an expander screw screwed into said end of the headed screw.

2. In shears or the like having a pair of blades and a pivot structure as set forth in claim 1 and in which pivot structure the interior bushing has a keyway extending a distance inwardly from its end which is adjacent the nut and the nut has a key portion extending into said keyway when the nut is in place on the interior bushing.

3. In shears or the like having a pair of blades and a pivot structure as set forth in claim 1 and in which pivot structure the interior bushing has a keyway extending a distance inwardly from its end which is adjacent the nut and the nut has a key portion extending into said keyway when the nut is in place on the interior bushing and the interior surface of the key portion of the nut is threaded in conformity with the threads of the screw.

HENRY C. WHEELER.

No references cited.